Oct. 8, 1968  J. S. PALMER  3,404,908
TRACTOR WHEEL SECURING DEVICE
Filed Oct. 19, 1966  3 Sheets-Sheet 1
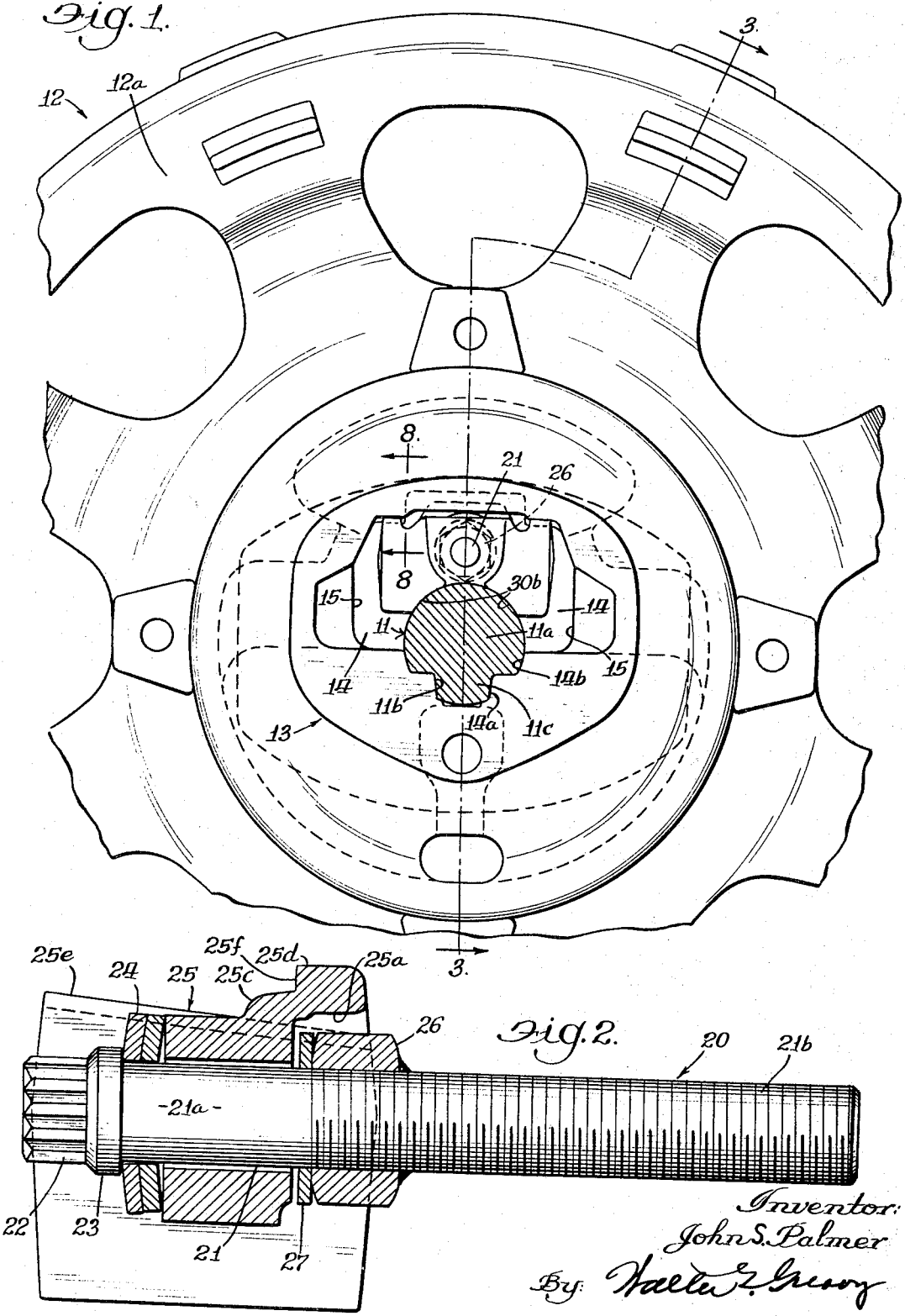
Inventor:
John S. Palmer
By Walter F. Gregory
Atty.

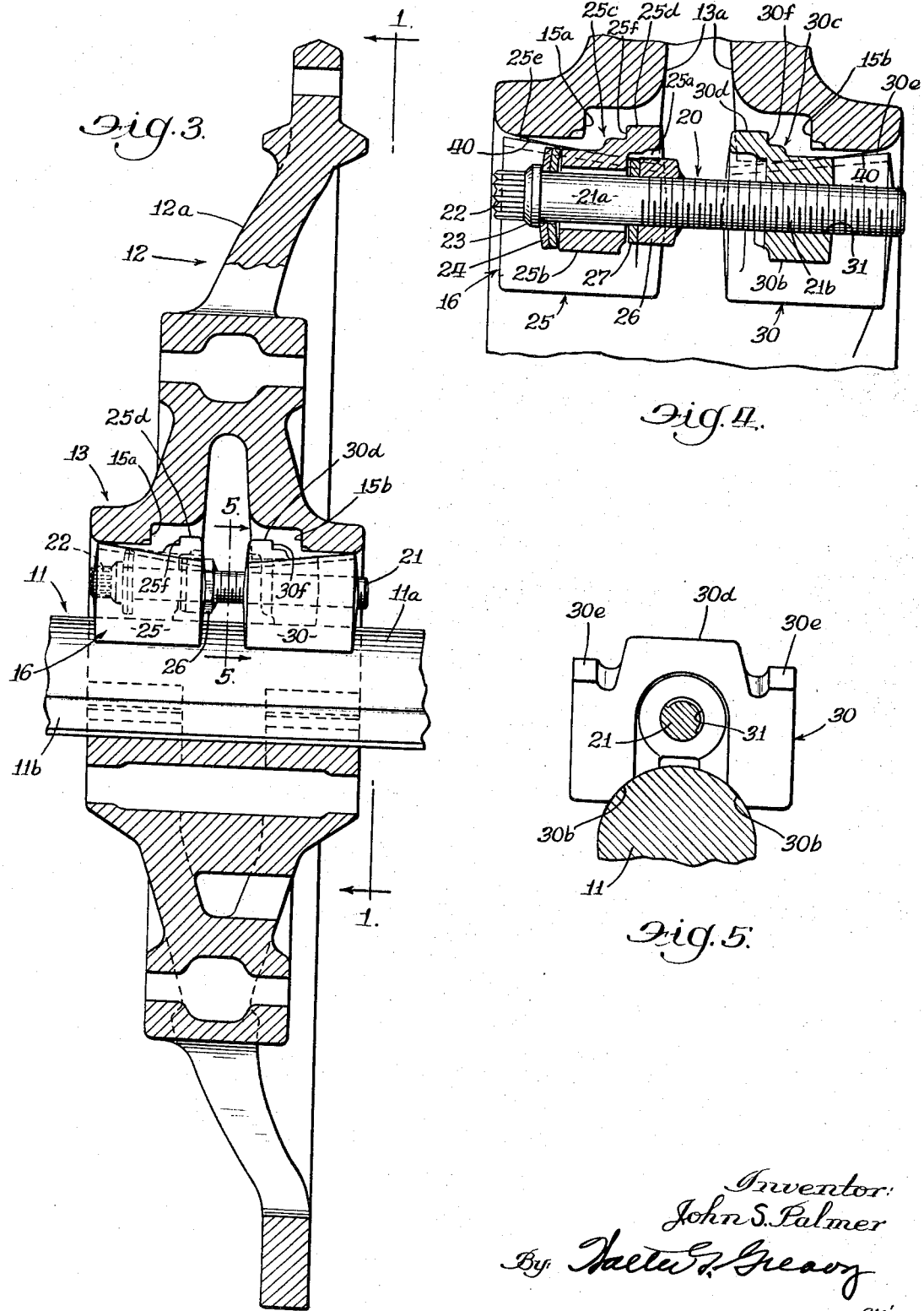

Inventor:
John S. Palmer

United States Patent Office 3,404,908
Patented Oct. 8, 1968

3,404,908
TRACTOR WHEEL SECURING DEVICE
John S. Palmer, Clarendon Hills, Ill., assignor to International Harvester Company, Chicago, Ill., a corporation of Delaware
Filed Oct. 19, 1966, Ser. No. 587,778
10 Claims. (Cl. 287—52.06)

This invention relates to a device for securing a tractor wheel on its axle in a manner enabling adjustment of the wheel to provide variation of tread. More particularly, it pertains to a mechanism for mounting such a wheel at any one of a number of predetermined axial locations, and adaptable to a variety of tractor types of which agricultural tractors are examples, and for selected purposes.

The demands of present-day agriculture upon the drive mechanisms of tractor necessitate the provision of sturdy, versatile, quickly-adaptable wheel and axle mounting structures. Some of the difficulties confronted and the objects and purposes sought to be achieved generally in providing such a mechanism are stated in the Smelcer et al., U.S. Patent No. 3,279,831 of Oct. 18, 1966. One of the more common problems is that of releasing the secured wheel when a wedge-type mechanism is used due to the tendency of wedged surfaces under high pressure to adhere.

A principal object of the present invention is the provision of simplified means generally similar in character to that exemplified in the reference cited, but more dependable, more susceptible of expeditious assembly and disassembly, and more readily adaptable, hence more efficacious, and less expensive to fabricate than prior art devices.

Another object is to provide an adjustable mechanism of the stated character comprising tapered cam elements movable along an axle into and out of tangential engagement with opposing curved ramp surfaces of a tractor wheel arranged thereon releasably to secure the wheel in preselected driving relation with the axle.

A further object is the provision of means for securing a wheel in predetermined driving relation with an axle which includes a plurality of oppositely tapered members slidably arranged in variable spaced relation on the axle for movement into and out of wedging relation with opposing ramps of the wheel under unitary control.

An additional object is to provide a mechanism for adjustably securing a drive wheel in variable, predetermined axial location on an axle of a tractor and comprising a plurality of members arranged in adjustable spaced relation with one another and in sliding relation with the axle, and having oppositely tapered surfaces, the wheel having axially spaced cut-out portions of predetermined configuration and including a plurality of arcuate ramps arranged for tangential engagement correspondingly with the tapered surfaces, and unitary means operable for moving those members into releasably secured wedging relation with the wheel and the axle and for effecting the release thereof.

Other objects and features of the invention will be made apparent as the description of the preferred embodiment proceeds.

In the drawings:
FIG. 1 is a side elevation of a portion of a wheel and axle assembly embodying the invention, as indicated in FIG. 3, partially in section.

FIG. 2 shows a detail vertical section of a portion of a sub-assembly forming a part of the invention.

FIG. 3 shows a partial section along the line 3—3, of FIG. 1 showing the sub-assembly in preferred position of operation securing the wheel on the axle.

FIG. 4 is an enlarged detail in vertical section of a portion of the invention shown in FIG. 3.

FIG. 5 is a section at 5—5 of FIG. 3.

Figure 6:
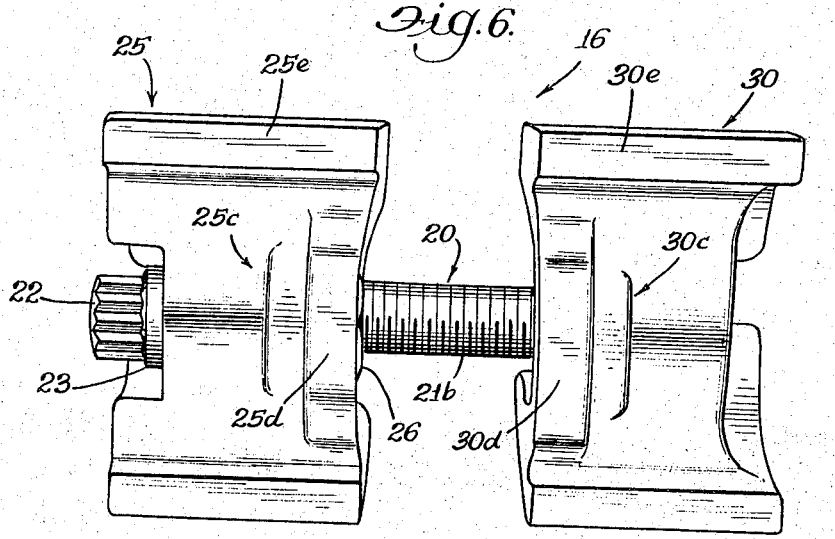
FIG. 6 is a top plan view of the sub-assembly showing the parts thereof in preliminary position of assembly.
Figure 7:
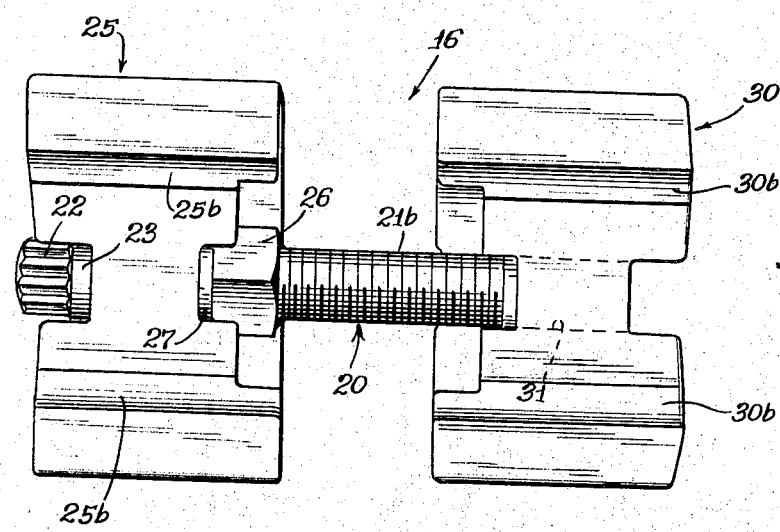
FIG. 7 is corresponding view of the bottom of the sub-assembly.

Referring to the drawings a conventionally supported rear drive axle 11 of an agricultural tractor (not shown) carries on an outer end 11a, a web-type cast iron drive wheel 12. This wheel has an enlarged central portion forming a hub 13 with spaced walls 13a, 13a and a generally central opening 14 extending therethrough. The opening generally defines an interior chamber or housing 15 of a configuration suitable for receiving in complementary operative relation the axle 11 and a generally wedge-type mechanism or sub-assembly 16 (to be described) in co-operative relation with the axle and the wheel for releasably securing the wheel upon the axle for heavy duty operation of the tractor.

In the preferred form of the invention illustrated in the drawings, axle 11 (FIGS. 1, 3) is generally cylindrical in form with circumferentially spaced peripheral recesses 11b, 11b extending longitudinally thereof and defining a key 11c. This key is adapted to be received in com-complementary splinning relation in a keyway 14a which forms a part of the opening 14, and extends through the wheel in spaced relation with the axis thereof. Arcuate surfaces 14b, 14b defining a portion of housing 15 interiorly of hub 13 adjacent keyway 14a co-operate with the latter to provide a seat for the axle enabling the securing thereof in releasable non-rotatable co-axial relation with the wheel upon operation of the sub-assembly 16, as will be seen.

Opening 14 and housing 15 provided thereby extend radially and circumferentially of wheel 12 generally oppositely of the portion thereof seating axle 11 and are conformed and disposed to receive the sub-assembly 16 in co-operative relation therewith in the manner following.

Sub-assembly 16 (FIGS. 2, 4) comprises a drive shaft 20 generally in the form of a bolt 21 having unthreaded and threaded portions 21a, 21b, respectively. A head 22 of conventional form is provided at one end (outer or rearward, left in FIG. 2) of the bolt to facilitate manual rotation of it. A shoulder 23 extending circumferentially of the bolt adjacent the head provides a support for a Belleville spring type washer 24 arranged on the bolt intermediately of the shoulder and a first wedge type member 25 which is arranged on the unthreaded portion of the bolt for rotation relative thereto and generally coaxial therewith. A recess 25a in the forward face of member 25 is provided for receiving in rotative relation stop means in the form of a nut 26, which is welded to bolt 21, and which is separated axially from member 25 by a thrust washer 27.

The arrangement of these parts of the sub-assembly 16 generally is such that while relative rotation between the drive shaft 20 and member 25 takes place upon the turning of the head 22 in one direction or another only slight movement of member 25 longitudinally of shaft 20 is permitted.

Sub-assembly 16 comprises in addition to member 25 a second wedge type member 30 generally similar in dimensions and conformation to member 25 but having a generally central threaded bore 31 receivable on threaded portion 21b in operative threaded relation and in generally opposed variable spaced relation with member 25.

As viewed in FIGS. 4 and 5 members 25 and 30 have a curved undersurface 25b, 30b, respectively, co-axial with an abutting surface of axle 11, for receiving the same in complementary slidable bearing relation longitudinally of said axle.

The upper surface of members 25, 30 comprises a generally convex central portion 25c, 30c with an outstanding shoulder or flange 25d, 30d and flanked by generally parallel uniplanar cam portions or wedges 25e, 30e of like dimension, configuration and arrangement, and as viewed in FIG. 4, the wedges of one member downwardly tapering correspondingly with those of the other member but in opposite direction (left versus right, FIG. 4) when said members are arranged on shaft 20 in opposed variable spaced relation as previously indicated.

The stated parts of sub-assembly 16 are so arranged and disposed in relation to one another that when members 25, 30 are held against rotation relative to one another and shaft 20 is rotated by turning head 22 in one direction (clockwise as shown, looking to the right in FIG. 4), member 30 will move along the shaft toward member 25; and when head 22 is turned in the reverse direction (counter-clockwise), member 30 will move in the opposite direction. Thus as head 22 and shaft 20 are rotated under such conditions of operation, so members 25 and 30 and their respective wedges are brought more closely together or farther removed from one another, and wedging operations thereof enhanced or diminished.

Figure 8:
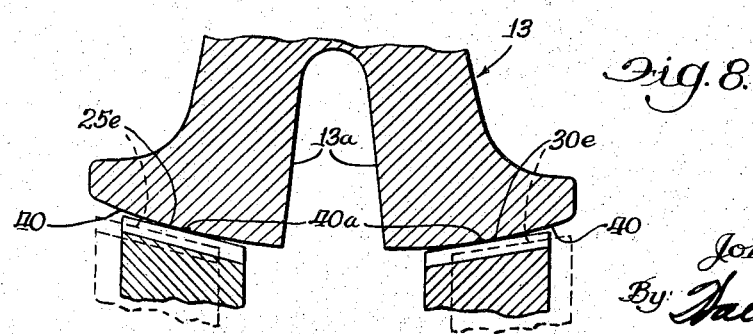
FIG. 8 is a detail section along the line 8—8 of FIG. 1, with dotted lines indicating a preliminary position of the sub-assembly.

Within housing 15 generally arcuate ramps 40 depending from walls 13a are provided (FIGS. 3, 4, 8). These are of like dimensions and forms, and arranged in predetermined spaced relation correspondingly for tangential wedging engagement with ramps 25e and 30e, respectively, in certain conditions of operation of sub-assembly 16 to be described. Ramps 40 are formed and disposed to provide effective tangential wedging relation with opposing wedges 25e, 30e at a target point 40a approximately midway lengthwise of ramps 40; i.e., the center of the pad of the wheel.

In practicing the invention, prior to mounting the wheel on the axle, sub-assembly 16, with the parts generally in the position shown in FIG. 6, 7, is manually positioned within housing 15 as illustrated in dotted lines FIG. 8. To facilitate this and to limit movement of the parts of the subassembly 16 longitudinally of shaft 20 walls 15a, 15b, are provided interiorly of housing 15 for abutment with corresponding wall portions or faces 25f, 30f, respectively, of shoulders 25d, 30d, in their extreme positions.

Sub-assembly 16 being thus positioned within housing 15, wheel 12 is then positioned on axle 11 by sliding with key 11c in keyway 14a, adjacent arcuate surfaces 14b of the wheel sliding along the adjacent surfaces of the axle and undersurfaces 25b, 30b, of members 25, 30 sliding along the adjacent upper surfaces of the axle, to the desired position of adjustment of the wheel on the axle. At that point shaft 20 is rotated by turning head 22 in that direction which will cause member 30 to move toward member 25 and bring wedges 25e, 30e, respectively into tight generally tangential wedging relation with ramps 40, 40, which should reach the desired magnitude for securing wheel 12 in operative relation on axle 11 at a point 40a approximately midway longitudinally of the ramps 40. When that is achieved the undersurfaces 25b, 30b of members 25, 30 will be firmly clamped against abutting surfaces of axle 11 securing the wheel in desired position of adjustment on the axle.

Release of the wheel from the axle is accomplished by reverse rotation of the driving shaft 20. This causes movement of member 30 longitudinally of shaft 20 (to the right in FIGS. 4, 8) and corresponding setting up of a force along the axis of the shaft tending farther to separate members 25 and 30 from one another and to retract the wedges 25e and 30e from wedging engagement with ramps 40; that force increasing as the reverse rotation of shaft 20 continues until such engagement involving one or the other of said members is broken. Thereafter, if both members 25, 30 were not released simultaneously, upon further continued reverse rotation of shaft 20 a point will be reached when the face 25f or 30f of shoulder 25d, 30d of the one or the other of members 25, 30 which has been released will engage a corresponding wall 15a of housing 15. Whereupon, such rotation of shaft 20 being continued axial force will build up to cause the release of the other of those members.

It will be readily appreciated from the foregoing description that the employment of a tangential wedging relation involving axially movable uniplanar tapering cam surfaces and stationary arcuate ramps in the manner stated greatly reduces the area of wedging contact and enhances the time saving factor in both the establishment of a firm wedging relation and the disestablishment or release thereof. The resilient role of washer 24 in the latter phase will be recognized. In this connection it is contemplated that the movable cam surfaces of the members 25, 30 may be of the arcuate convex type and the ramps of the housing 15 of the uniplanar tapering type; no distinction being attached to the use of the words ramp and wedge in this respect.

A particular feature of versatility of the invention rests in its adaptability to the various wheel arrangements in current usage. For example, it will be readily seen that as disc type wheels (FIGS. 1, 3) are reversed (convex inwardly instead of outwardly) and set in selected axle positions, as to narrow or widen the tread, the sub-assemblies 25, 30 of the invention may be reversed correspondingly so that the head 22 will be readily accessible adjacent the outer end of the hub 13.

It will be understood that changes of forms and structure, including reversal of parts, substitution of equivalents, and other modifications, may be made without departing from the spirit, substance and scope of the invention.

I claim:

1. A wheel mounting assembly comprising
    (a) an axle having a generally cylindrical end portion for mounting a wheel in driving relation,
    (b) a wheel having an enlarged hub-like central portion with a generally central opening extending therethrough forming a housing,
    (c) a first portion of said housing being defined by a generally arcuate surface disposed coaxially of said wheel and arranged to seat said axle,
    (d) complementary means on said axle and wheel for preventing relative rotation therebetween,
    (e) a second portion of said housing extending generally oppositely of said first portion radially and circumferentially of said wheel and being conformed and disposed to receive a wedge type sub-assembly in cooperative relation therewith,
    (f) a plurality of generally parallel tapered ramps on said wheel interiorly of said housing in predetermined spaced relation with one another and with the axis of the wheel, said ramps being curved longitudinally thereof and respectively arranged and disposed for tangential wedging engagement with corresponding wedges of said sub-assembly,
    (g) a wedge type sub-assembly comprising
        (1) a rotatable drive shaft,
        (2) a first member mounted on said shaft adjacent one end thereof co-axially therewith and for rotation relative thereto,
        (3) means on said shaft restricting movement of said first member longitudinally of said shaft,
        (4) a second member removably threaded on said shaft in variable, opposed spaced relation and co-axially with said first member,
        (5) said members being generally similar in conformation and having on one side thereof a bearing surface for receiving a corresponding surface of said axle in co-axial sliding relation, and on the opposite side thereof in predetermined spaced relation with one another and with the axis of said shaft a plurality of generally parallel tapered wedge surfaces configured for tangential engagement with said ramps, (6) said first and second members and the parts of said sub-assembly associated therewith being so conformed and arranged for operation in relation to one another and to said shaft that upon said sub-assembly being positioned for operation within said housing, with said wedge surfaces respectively in juxtaposition with corresponding ramps, the axle being seated in stated splined relation with the wheel, rotation of said shaft in one direction will cause said members to move toward one another thereby bringing the respective wedge surfaces into tangential wedging engagement with said corresponding ramps thereby effecting the clamping of the wheel upon the axle, and subsequent predetermined reverse rotation of the shaft, will cause reverse movement of the members thereby enabling release of the wheel.

2. A wheel mounting assembly as defined in claim 1 in which the ramps are of predetermined curvature and the wedge surfaces uniplanar and of predetermined angulation, and effective tangential wedging engagement occurs substantially midway longitudinally of the ramps.

3. A wheel mounting assembly as defined in claim 2 in which the stated reverse rotation of the shaft effects interruption of the tangential wedging engament of certain of said wedge surfaces and ramps.

4. A wheel mounting assembly as defined in claim 1 in which complementary means are provided on the wheel interiorly of the housing and on said members, said complementary means being interengageable in certain conditions of operation to restrict movement of the members longitudinally of the shaft whereby to enable release of the wheel from the axle.

5. A wheel mounting assembly as defined in claim 4 in which the complementary means are arranged for interengagement upon predetermined reverse rotation of the shaft to interrupt wedging engagement of certain of said wedges surfaces and ramps.

6. A wheel mounting assembly as defined in claim 1 in which the wedge surfaces and ramps, respectively, are arranged in pairs, one pair of wedge surfaces on said first member being arranged for tangential wedging engagement respectively with a corresponding pair of ramps and another pair of wedge surfaces on said second member being similarly arranged in relation to another pair of ramps and said predetermined reverse rotation of said shaft operating to effect disengagement of one of said pairs of wedge surfaces from said corresponding pair of ramps.

7. A wheel mounting assembly as defined in claim 6 in which the restricting means include stop means fixed on said shaft forwardly of said first member and resilient stop means positioned on said shaft rearwardly of said first member and in engagement with an adjacent surface of said first member and enabling slight movement thereof along said shaft upon rotation of said shaft under predetermined conditions of operation, the resilient stop means comprise a collar fixed on the shaft and a spring type washer associated therewith and said first stop means comprises a nut fixed on the shaft in spaced relation with the collar and washer, said first member having a recessed bearing surface accommodating relative rotation of said nut, and enabling said disengagement of one of said pairs of wedge surfaces from said corresponding pair of ramps upon said subsequent reverse rotation of said shaft.

8. A reversible wheel mounting assembly comprising (a) an axle having a generally cylindrical end portion for mounting a wheel in driving relation,
(b) a wheel having an enlarged hub-like central portion with a generally central opening extending therethrough forming a housing,
(c) a first portion of said housing being defined by a generally arcuate surface disposed coaxially of said wheel and arranged to seat said axle,
(d) complementary means on said axle and wheel for preventing relative rotation therebetween,
(e) a second portion of said housing extending generally oppositely of said first portion radially and circumferentially of said wheel and being conformed and disposed to receive a wedge type sub-assembly in cooperative relation therewith,
(f) a plurality of generally parallel tapered ramps on said wheel interiorly of said housing in predetermined space relation with one another and with the axis of the wheel, said ramps being respectively arranged and disposed for tangential wedging engagement with opposed ramps of said subassembly,
(g) a reversible wedge type sub-assembly comprising
  (1) a rotatable drive shaft,
  (2) a first member mounted on said shaft adjacent one end thereof co-axially therewith and for rotation relative thereto,
  (3) means on said shaft restricting movement of said first member longitudinally of said shaft,
  (4) a second member removably threaded on said shaft in variable, opposed spaced relation and co-axially with said first member,
  (5) said members being generally similar in conformation and having on one side thereof a bearing surface for receiving a corresponding surface of said axle in co-axial sliding relation, and on the opposite side thereof in predetermined spaced relation with one another and with the axis of said shaft a plurality of generally parallel tapered ramps, one group of the group of ramps constituting those on the wheel interior and the group constituting those on the sub-assembly being curved longitudinally thereof and the other group being configured for tangential engagement therewith,
  (6) said first and second members and the parts of said sub-assembly associated therewith being so conformed and arranged for operation in relation to one another and to said shaft that upon said sub-assembly being positioned for operation within said housing, with said last mentioned ramps respectively in juxtaposition with corresponding ramps of said housing, the axle being seated in stated splined relation with the wheel, rotation of said shaft in one direction will cause said members to move toward one another thereby bringing the respective ramps of said members into tangential wedging engagement with said opposed ramps thereby effecting the clamping of the wheel upon the axle, and subsequent predetermined reverse rotation of the shaft, will cause reverse movement of the members thereby enabling release of the wheel.

9. A reversible wheel mounting assembly as defined in claim 8 in which certain of the ramps are of predetermined curvature and others uniplanar and of predetermined angulation, and complementary means are provided on the wheel interiorly of the housing and on said members, said complementary means being interengageable in certain conditions of operation to restrict movement of the members longitudinally of the shaft, whereby to enable release of the wheel from the axle upon predetermined reverse rotation of the shaft to interrupt wedging engagement of certain of said ramps.

10. A reversible wheel mounting assembly as defined in claim 8 in which the restricting means include stop means on said shaft forwardly of said first member and resilient stop means positioned on said shaft rearwardly of said first member and in engagement with an adjacent surface of said first member and enabling slight movement thereof along said shaft upon rotation of said shaft under predetermined conditions of operation, whereby to enhance the efficacy of the clamping relation effected by the tangential wedging engagement of the opposing ramps and facilitating the release thereof.

References Cited

UNITED STATES PATENTS

| | | | |
|---|---|---|---|
| 483,227 | 9/1892 | Little | 287—52.04 XR |
| 2,751,255 | 6/1956 | Schroeder | 301—1 |
| 3,279,831 | 10/1966 | Smelcer et al. | 287—52.05 |
| 3,302,959 | 2/1967 | Smelcer | 287—52.06 |

CARL W. TOMLIN, *Primary Examiner.*

A. KUNDRAT, *Assistant Examiner.*